United States Patent [19]

James

[11] Patent Number: 5,542,418
[45] Date of Patent: Aug. 6, 1996

[54] ACID-BASE FUELS FOR SELF HEATING FOOD CONTAINERS

[75] Inventor: Dean B. James, Saratoga, Calif.

[73] Assignee: Hotcan International, Ltd., Santa Barbara, Calif.

[21] Appl. No.: 380,238

[22] Filed: Jan. 30, 1995

[51] Int. Cl.$^6$ .................................................. F24J 1/00
[52] U.S. Cl. ............................ 126/263.06; 126/263.09
[58] Field of Search .................................. 126/206, 246, 126/263 D, 263 DA, 263 DC, 263 E; 426/109; 44/250, 251; 252/70

[56] References Cited

U.S. PATENT DOCUMENTS

| | | | |
|---|---|---|---|
| 3,980,070 | 9/1976 | Krupa | 126/263 D |
| 4,741,324 | 5/1988 | Ina et al. | 126/263 E |
| 4,793,323 | 12/1988 | Guida et al. | 126/263 DC |

Primary Examiner—James C. Yeung
Attorney, Agent, or Firm—Marvin E. Jacobs

[57] ABSTRACT

An exothermic, hydratable fuel mixture for a self-heating food container comprises particles of a base such as lime and an acid such as oxalic acid. When water is added to the mixture, exothermic heat is generated by hydration of the lime and neutralization reaction between the lime and the acid. Mixtures of bases and mixtures of acids can be used to optimize the heating characteristics of the fuel mixture.

10 Claims, 7 Drawing Sheets

ACID-BASE FUELS FOR SELF HEATING FOOD CONTAINERS

TECHNICAL FIELD

The present invention relates to exothermic compositions for warming a sealed food container and, more particularly, to a dry acid-base composition that has a long shelf life and generates heat on contact with water.

BACKGROUND OF THE INVENTION

There is a demand for meal packages that include a heating medium. These meals can be used by hikers, climbers, forest fire fighting crews, etc. The largest demand is for tasty, convenient meals for military personnel to carry while in action on maneuvers. The self-contained heat source eliminates the necessity to carry stoves and fuel, and the meal can be heated without a hot fire or flame which can be easily detected by infra-red detectors by the enemy.

The most widely used heating medium is based on the reaction of quicklime and water. However, in order to provide an optimum package, weight and cost are principal considerations. Also important is the ability to heat the food without causing overboiling and spattering of the lime-water reaction mixture which can be a hazard to the user or can contaminate the food.

STATEMENT OF THE PRIOR ART

There are many possible configurations for the container such as a tray as disclosed in U.S. Pat. No. 4,771,761. The most popular form of heatable food container is a can-in-can form of product in which the inner sealed can contains the food and the outer annulus between the two cans contains two compartments separated by a pierceable membrane. One compartment contains the hydratable lime and the other contains water.

U.S. Pat. No. 4,501,259 to Apellaniz discloses a food container in which the reactivity of the quicklime has been reduced by calcining the quicklime at a temperature from 1,100° C. to 1,400° C. Apellaniz utilizes an excess of water. The amount of water is from 0.75 to 3.0 parts by weight per part by weight of the quicklime. The excess water results in a milky, alkaline, hot residue which can leak out the puncture holes and become a hazard to the user. Apellaniz in a later U.S. Pat. No. (4,748,035) teaches that slow reacting, overburnt lime (calcined above 1150° C.) can be used if 6–75 percent of a high or medium-reactivity quicklime is added, preferably from 12 to 50 percent by weight of the high- or medium-reactivity soft-burnt quicklime, i.e. quicklime burned at a temperature from 900° to 1,150° C. to a porous condition. The grain size is usually 2–5 mm. The overburnt limes exemplified were calcined at 1,200° C. for four hours. Again an excess amount of water was used to provide the slaking reaction and the reaction product is a hazardous, hot, alkaline liquid. The disposal of the container with caustic liquid residue is an environmental and safety concern.

A self heating food can product now being produced and marketed in England and Europe uses a container design and chemical fuel that is commercially acceptable. The chemical reactants are water and quicklime, an industrial chemical that is a reactive, but impure and inexpensive form of calcium oxide (CaO). Solid calcium hydroxide and heat are produced as shown in the following reaction:

$$CaO + H_2O \rightarrow Ca(OH)_2 + 277 \text{ calories/gram of CaO}$$

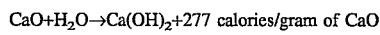

The reaction of normal commercial quicklime with water is too rapid; the unreacted water boils and before sufficient heat can pass through the wall of the inner food can and into the food, 543 calories per gram of vaporized water can be lost from the fuel mixture as steam. Extra fuel had to be added to compensate for the loss. Since the annulus between the can of food and the outer can must be vented during the heating reaction, there was the danger that steam or hot lime milk, which is caustic (pH=12.5), would be expelled from the can and injure the user. Also quicklime readily absorbs water vapor and carbon dioxide from air. Therefore, the annulus of the self heating can must be tightly sealed and the barrier between the quicklime and the water must be very effective, or the fuel will slowly lose its heat-producing capacity while the can is in storage before use. Furthermore, the calcium hydroxide that remains in the used, self-heating food can is a moderately strong base that cannot be easily disposed of in a safe manner.

In the self heating food can currently available commercially in England and Europe, the quicklime reacts more slowly with water because it is produced by calcining limestone at 1100° to 1300° C. rather than the 900° C. used for conventional quicklime. Although it adds to the weight, a large excess of water assures more uniform heating and helps conduct the heat to the wall of the inner food can. A torus-shaped metal-foil bag holds the water above the lime. It is pierced to initiate the heating. The empty bag reduces the likelihood of lime-milk spattering. The metal foil assures an adequate shelf-life. However, this commercial product has extra weight due to the excess water and also suffers from the hazard of the hot calcium hydroxide residue.

STATEMENT OF THE INVENTION

It has now been discovered in accordance with the invention that even-heating, long shelf-life, self-heatable food containers can be provided in which the reaction product is not hazardous. The fuel-water mixture of the invention heats the food in acceptable time in a safe and efficient manner. The fuel of the invention generates heat in a controlled and sustained manner for a period of time sufficient to warm the food in the inner container without the hazards of flame, boilover, explosion, alkalinity, or toxicity. The fuel of the invention adds an acid to the fuel mixture that exothermically reacts with lime or other base to produce heat and a neutral (non-alkaline) residue.

Exothermic chemical compositions are provided that are comprised of one or more solid, particulate, basic reactants such as oxides of alkaline earth metals that are reacted with water and one or more solid, anhydrous, granular, acidic reactants, such as acids or acid salts. The exothermic hydration and neutralization reactions are initiated by contacting the dry, particulate solids with water. The proportion and total quantity of the alkaline and acidic reactants are selected so that when completely reacted the residue will be a solid, nonhazardous, essentially neutral salt of the cation of the alkaline earth metal and the anion of the acid or acid salt. By careful choice of quantity, particle size and/or acidic or basic strength of the solid reactants, the reactivity of the alkaline earth oxide and the amount of water used, a controlled, two-stage heating process is produced that does not require as much water. There is first a moderately rapid hydration reaction that heats but does not overheat the water and solid reactants in the annular chamber. There is a second less rapid neutralization reaction that produces heat more slowly to keep the reactants hot but not overheated as heat is transferred from the annular chamber through the wall of the inner container and into the food.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
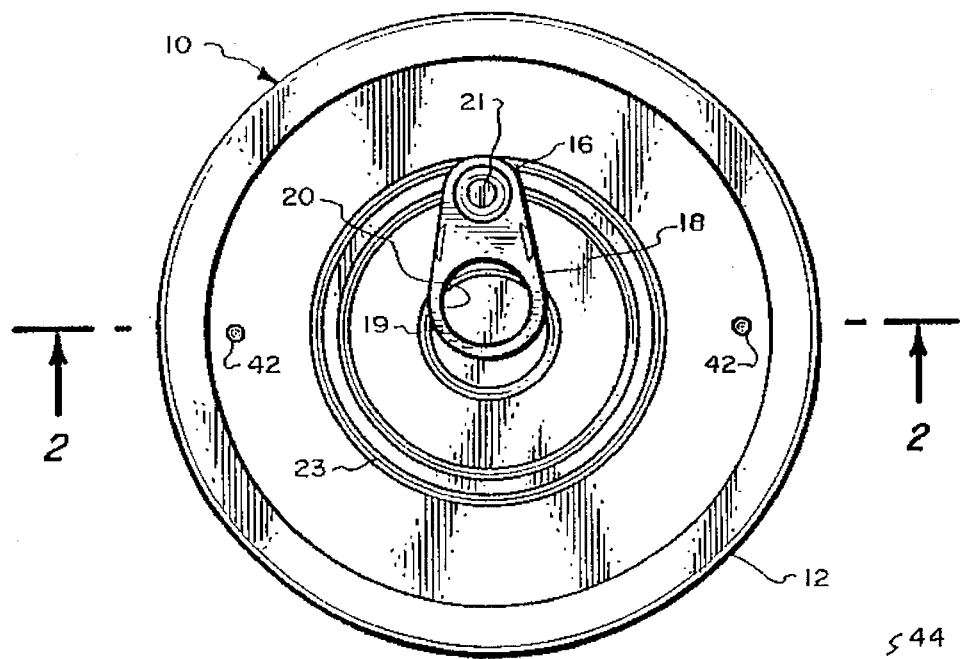
FIG. 1 is a top plan view of a food container in accordance with the invention.
Figure 2:
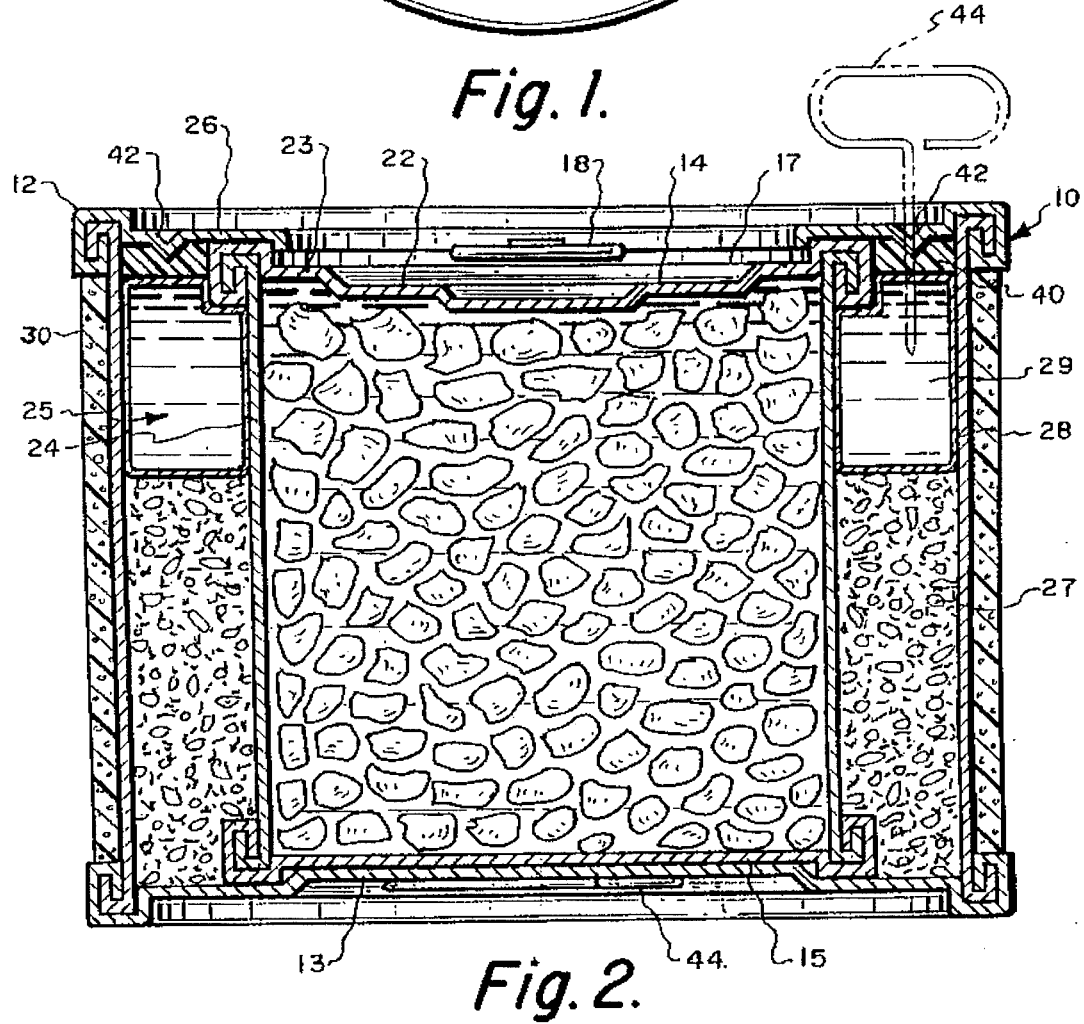
FIG. 2 is a view in section taken along line 2—2 of FIG. 1.

Referring now to FIGS. 1 and 2, a tightly closed cylindrical can 10, contains the food to be heated before its consumption. The food can 10 is placed in an outer container 12 having the shape of a cylindrical can. The outer container 12 has a closed bottom 13 and is open at its opposite end 14. The outer container 12 is coaxial with the food can 10, the bottom 15 of which is centered on the bottom 13 of the outer can 12 by means of a centering ring 16. The top 17 of the food can 10 is provided with an opening device 18 on the lid 22 which closes the top of the can 10. This device 18 can comprise a tongue 19 provided with an eyelet 20 and with a tab 21 that is attached to the lid 22. When the tongue 19 is pulled by hand, the lid 22 of the food can 10 tears along a circular line of small resistance shown by the thinned line 23 of the lid 22. The food can 10 may be opened by means of this known device 18, without the need of using a special opening tool.

A closed, annular chamber 25 is formed between the outer container 12 and the side wall 24 of the food can 10. The chamber 25 is closed on the side adjacent to the top end 17 of the food can 10, by an annular strip or ring 26 that is made of an easily pierceable material, such as thin metal sheet or a plastic sheet such as polyethylene or polyester. One edge of the annular ring 26 is crimped to the free edge (opposite the closed bottom 13) of the container 12, whereas the other edge of the annular strip 26 is also crimped to the end of the side wall 24 of the inner food can 10 that is adjacent to its top end 17. The annular strip 26 tightly closes the annular chamber 25 that contains the reactants necessary for the exothermic reaction used for heating the contents of food can 10. An annular plastic ring 40 may be disposed below the annular strip 26 to further ensure sealing of the annular chamber 25.

The particles 27 of base and acid reactants are placed in the lower part of the annular chamber 25. A torus shaped bag 28 is disposed in the upper portion of the annular chamber 25 above the particles 27. The bag 28 can be made of a water-vapor impermeable, very flexible plastic such as, for example, polyethylene. The flexible bag 28 contains water 29 under slight pressure. When a pointed tool, such as a spike 44, is pushed through thinned metal ports 42 in the metal ring 26 and the underlying plastic ring 40, the bag is pierced, the water is expelled from the bag 28 and flows and distributes quickly, by gravity, into the solid reactant particles 27 located under the bag 28 and initiates the exothermic reaction uniformly across the body of the particles 27. The outer face of the outer container 12 can be provided with a heat-insulating layer 30 such as polystyrene foam and can be decorated with the product label. The spike tool 44 can be attached to the bottom or top of the can-in-can product.

The exothermic fuel compositions of the present invention are comprised of solid, particulate, alkaline, earth oxide reactants and solid, particulate, anhydrous acid reactants.

The use of alkaline earth hydroxides or alkali oxides instead of alkaline earth oxides would produce less heat on a molar basis, so more reactants would be required. Acids having high solubility in water could be dissolved in the water contained in the bag. Acids that are not anhydrous, granular solids would be quite strong and extremely corrosive if they were sufficiently soluble in water to avoid excessive weight. A failure of the bag containing the fuel would rapidly corrode the inner and outer cans and become a serious hazard to the user. Also, when solutions of the strong acids are heated, noxious or objectionable vapors would be released.

Excess weight or bulk of the fuel is also a prime consideration. Therefore, alkaline earth oxide and anhydrous acid reactants with lower equivalent weights are more advantageous, i.e., magnesium oxide or calcium oxide would be favored over strontium oxide or barium oxide. Solid acids such as oxalic, sulfamic, citric and tartaric would be favored over benzoic, trichloroacetic, gluconic and succinic.

Because the alkaline earth oxides are all quite hygroscopic, the solid acids must be anhydrous, i.e., they must not carry waters of hydration or absorbed moisture. When a alkaline earth oxides is mixed with a hydrated solid acid, the alkaline earth oxide would be slowly dehydrated, slowly liberating heat. A significant portion of the heating capacity of the fuel would be lost while the can was in storage awaiting use.

Some water must be added to initiate the reaction but since water is a byproduct of the neutralization reaction, less water would be required than for an acid-base fuel composition than one that uses alkaline earth oxide alone. Also, the weight of the total solid acid-base reactants required to produce the same amount of heat is less than the weight of a comparable alkaline earth oxide exothermic fuel. For example, slaked quicklime produces 277 calories per gram of solid fuel. However, a mixture of equivalent amounts of calcium oxide and oxalic acid produces 340 calories per gram of solid fuel.

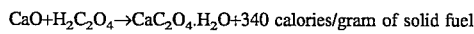

$$CaO+H_2C_2O_4 \rightarrow CaC_2O_4.H_2O+340 \text{ calories/gram of solid fuel}$$

Thus it can be seen that the acid-base fuel of the invention would not only produce innocuous calcium oxalate rather than hazardous calcium hydroxide, it would also produce more heat on a weight basis. Therefore, less fuel by weight could be used to produce the same heating effect.

The invention also contemplates fuel compositions formed by mixing bases of different reactivity with acids of different reactivity. This offers a method for advantageous control of the rate at which heat is generated from the fuel. As discussed above, less fuel is needed if less of the heat is lost due to water vaporization which occurs to a much greater extent if the water in the annulus boils. However, it is advantageous to rapidly heat the contents of the annulus to near the boiling temperature of water so that heat will be transferred more rapidly to the food due to a greater difference in temperature between the annulus and the food. Thus, a fuel composition with two heat generation rates would be advantageous. A first higher heat generation rate is sustained only long enough to raise the temperature of the water and fuel mixture to near, but not above, the boiling point of water. A second lower heat generation rate to maintain the temperature of the food in the inner can by a second heat rate that is nearly equal to the rate at which heat is lost from the system.

Different reactivities (heat generation rates) of the reactants of the fuel composition can be provided by a mixture of different alkaline earth oxides. This is because the base strengths of the alkaline earth oxides decrease in the order of increasing molecular weight, and base strength affects acid-base reactivity. Another means to provide two-step heat generation would be to use two quicklimes of different reactivities caused by the different temperature at which they were calcined in their production from limestone.

A self heating can similar to the assembly shown in FIGS. 1 and 2 was used for a series of experiments. In these experiments, 370 grams of water in the inner (food) can was used to simulate food. An experiment with a thick chili instead of water established that the heat capacity and viscosity of water was sufficiently similar to food to permit water to be used as a stand-in.

EXAMPLE 1

In each of the following four experiments, 65 grams of lime, 110 grams of oxalic acid, and 155 grams of fuel water were used. The annulus of the inner can contained 370 grams of water.

| Sample No. | Lime Type  Amount Grams |
|---|---|
| 25 | Slowly Reactive 65 |
| 26 | Unslakable, Dead Burned 65 |
| 27 | Unslakable 20  Slowly Reactive 45 |
| 28 | Very Reactive 20  Slowly Reactive 45 |

The line in Sample 25 is similar to the line used in the commercial product currently available in England and Europe.

Figure 3:
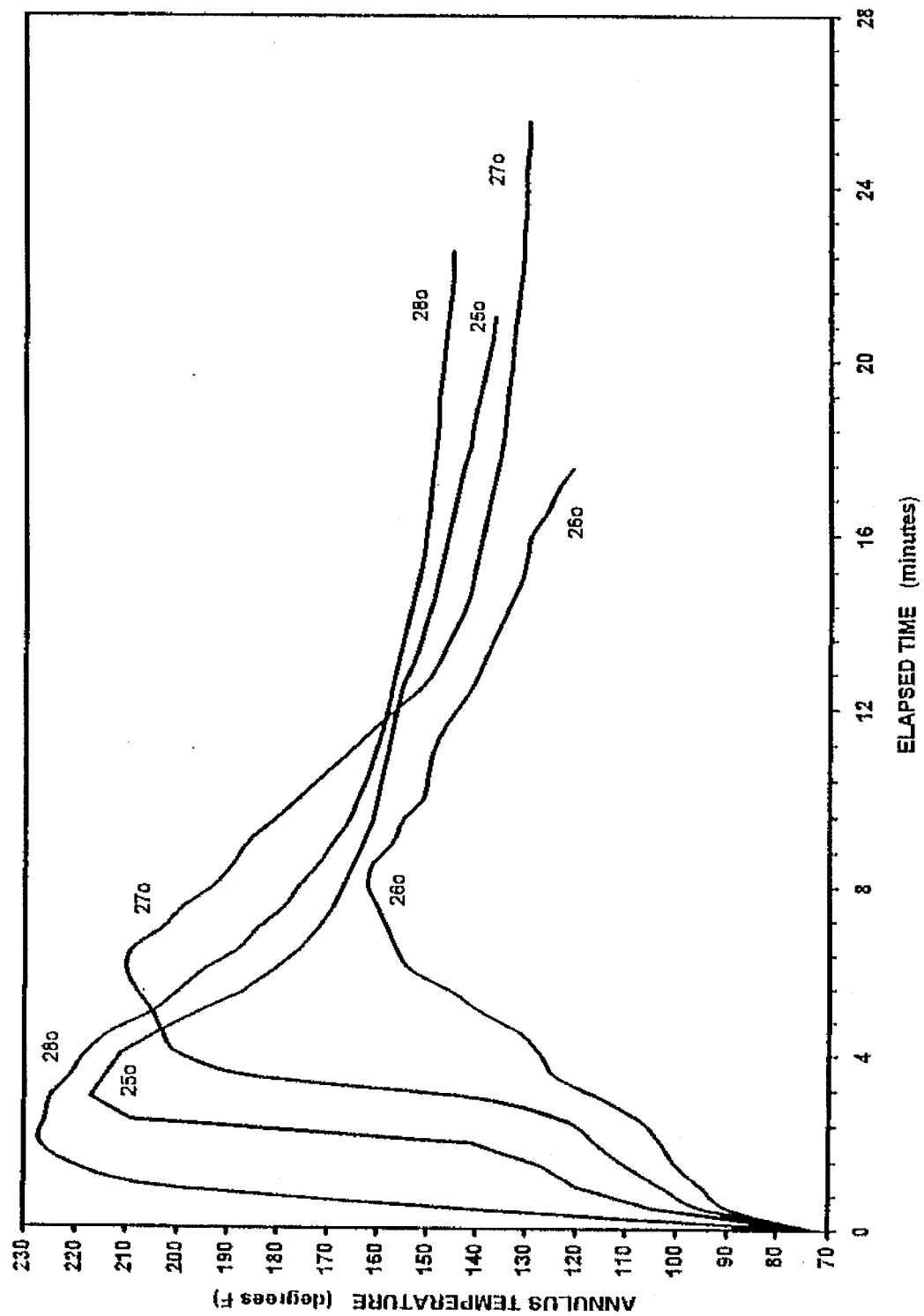
FIG. 3 is a set of curves of temperature change versus elapsed time of food (simulated by water) within the inner food can for four experiments in which the same amounts of quicklime, water and oxalic acid were used as exothermic reactants with equivalent amounts of quicklimes of different reactivities or with equivalent amounts of mixtures of these quicklimes.
Figure 4:
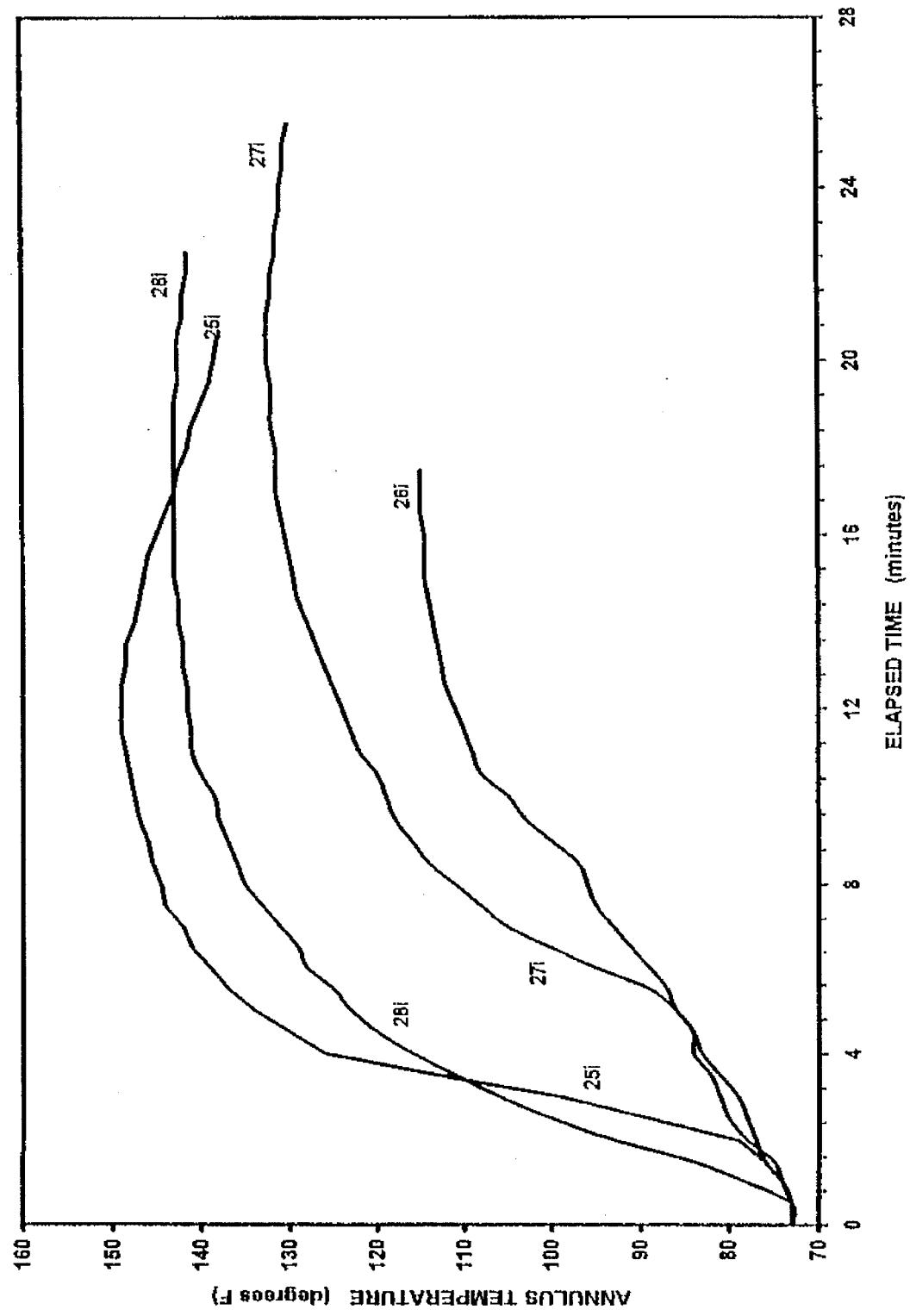
FIG. 4 is a set of curves of temperature change versus elapsed time of the reactants in the annulus for the same four experiments as in FIG. 3.

FIGS. 3 and 4 demonstrate the advantages of using mixtures of two quicklimes of different reactivity in combination with an acidic reactant such as oxalic acid. The annulus temperature curves are shown in FIG. 4 and the food can temperature curves are shown in FIG. 3.

From FIG. 4 it is clear that Sample 25 with a fuel mixture of all slowly reactive quicklime and oxalic acid, and Sample 28 with a fuel mixture of very reactive and slowly reactive quicklimes and oxalic acid produced acceptable heating of the contents of the inner can. The experiments with unslakable lime and oxalic acid Samples 26 and 27 were unsatisfactory.

The shapes of the curves in FIG. 3 reveal the importance of a fuel composition with two different heat generation rates. Curves 25 and 28, demonstrate a more rapid rise in annulus temperature and a more delayed decrease in annulus temperature. In Sample 28 the annulus temperature was above 200° F. for a period longer than four minutes (curve 28). During this period the food can temperature was increasing in the range of 90 to 130 degrees Fahrenheit. The sustained temperature difference of 110 to 70 degrees Fahrenheit between the annulus and the food can provided the driving force for sustained heat transfer. Clearly, the more advantageous fuel composition is the one that maximizes this integral of time and annulus-food temperature difference. The curves of FIG. 3 show a decreasing value of the annulus time-temperature integral in the order 28o, 25o, 27o and 26o.

By maximizing this integral, the heat generation process is more controlled. Therefore, less fuel water will be needed for such control.

The following experiment (Sample 29) was conducted to optimize the fuel mixture.

| Sample No. | Lime Type/Amount, g | Oxalic Acid, g | Water, g |
|---|---|---|---|
| 29 | Very Reactive/30 | 95 | 115 |

Figure 5:
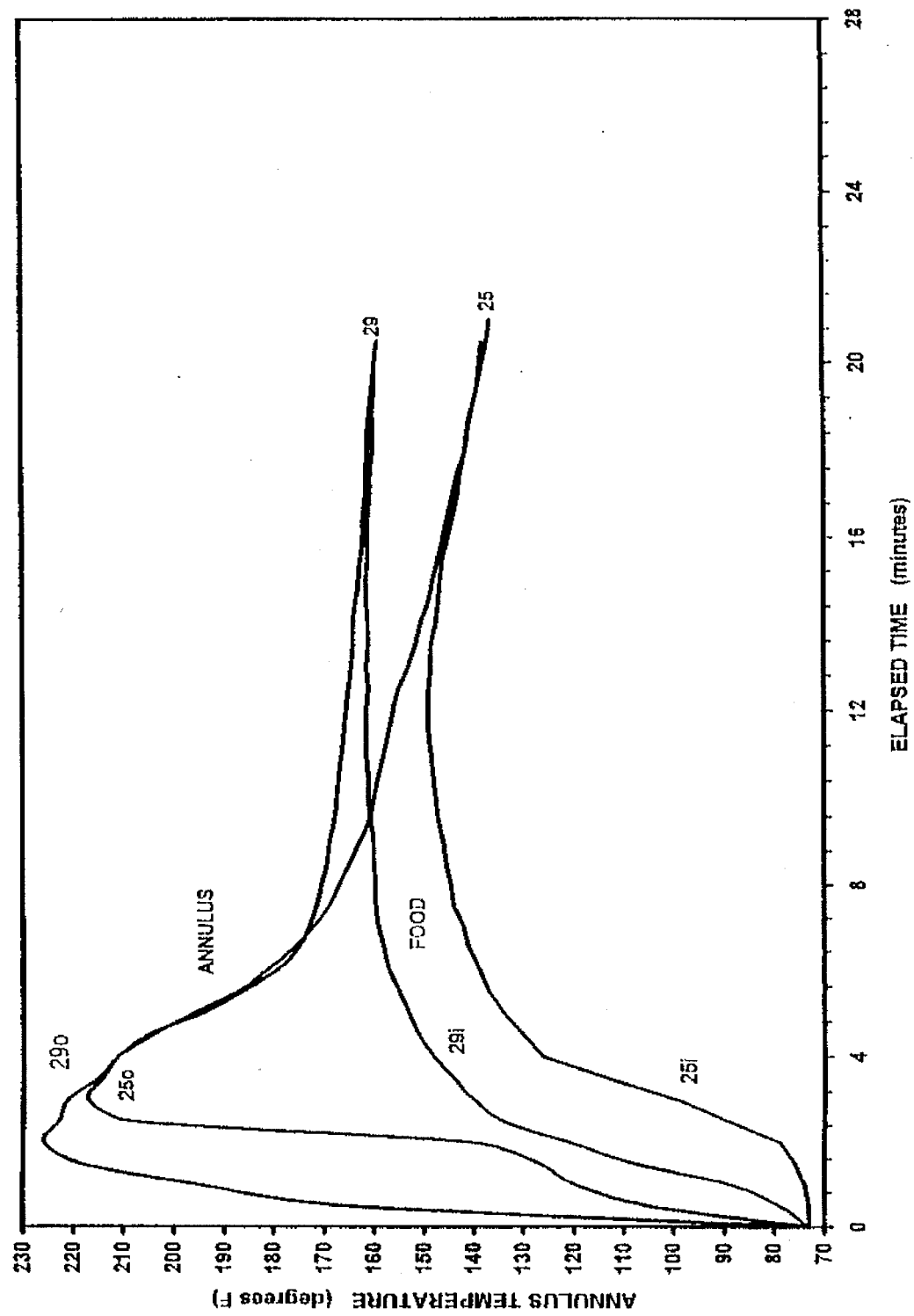
FIG. 5 is a set of curves of temperature change versus elapsed time of fuel-water reactants between the annulus and the cans and of food (simulated by water) within the inner food can for a set of experiments in which appropriate amounts of water, oxalic acid, and a single, moderately reactive quicklime were used as exothermic fuel and a set of analogous curves from a set of experiments in which lesser amounts of water oxalic acid and equivalent amount of a mixture of two quicklimes of different reactivities were used as the fuel-water reactants in the annulus.

This is a total fuel weight of 270 grams or 18 percent less weight than the single-quicklime fuel composition that produced curves 25o and 25i. The results of the two experiments are compared in FIG. 5. The curves for the more optimum fuel composition are identified as 29o and 29i. It is noted that the annulus time-temperature integral for curve 29o is much larger than this integral for curve 25o. This is why less fuel produced a higher final food temperature.

The use of different solid, particulate acids in acid-base fuel compositions is illustrated in the following experiments, each utilizing 65 grams of slowly reactive quicklime, along with an approximately equivalent amount of solid acid and 100 grams of fuel water.

| Sample No. | Acid, g |
|---|---|
| 30 | Sulfamic |
| 31 | Tartaric |
| 32 | Citric |
| 33 | Oxalic |

Figure 6:
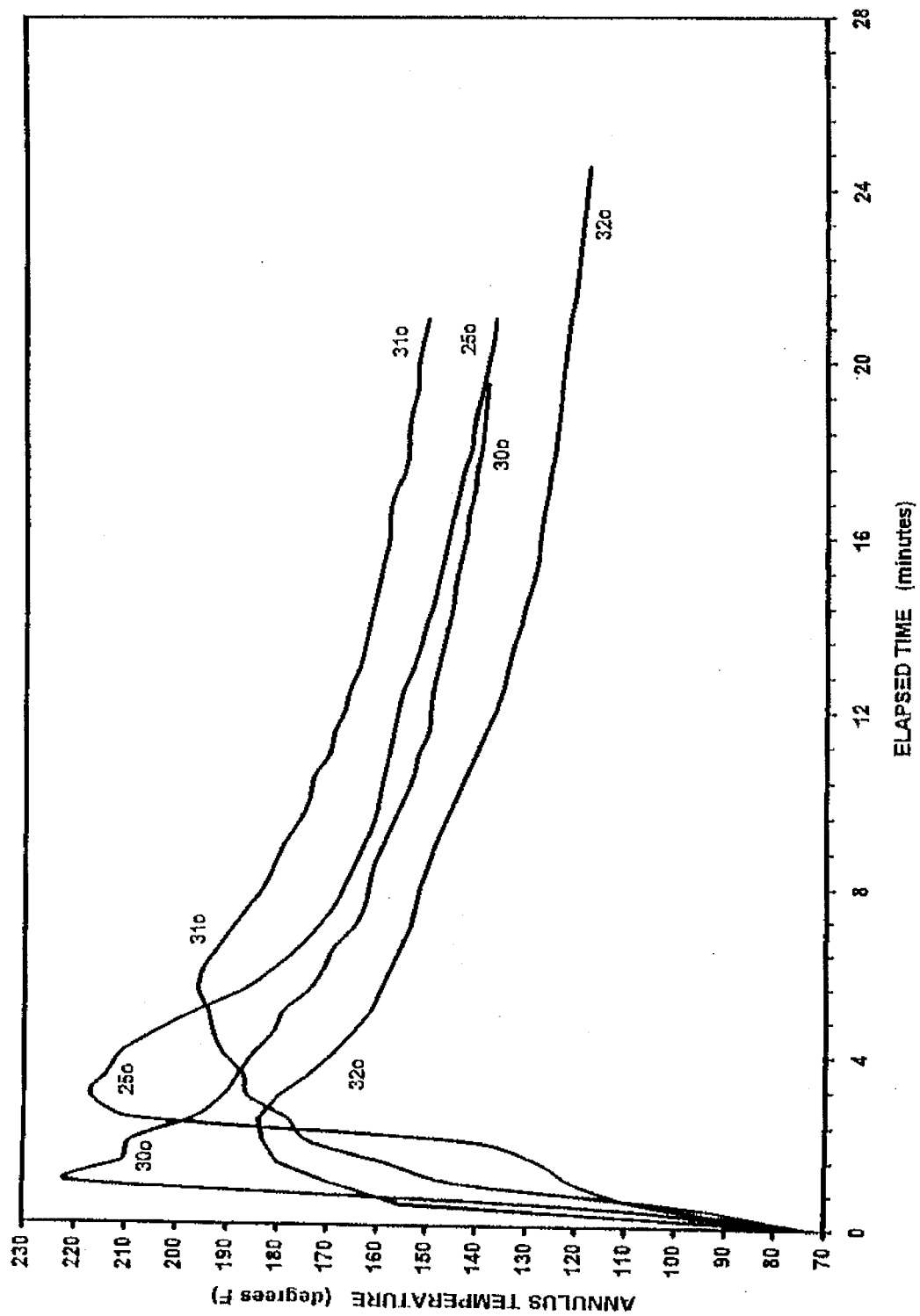
FIGS. 6 and 7 are sets of curves of temperature change versus time of the annulus reactants and of food (simulated by water) within the inner food can for four experiments in which the same amounts of water and a quicklime of moderate reactivity were used as reactants with an equivalent amount in each experiment of the solid particulate acids: oxalic acid, sulfamic acid, tartaric acid and citric acid.
Figure 7:
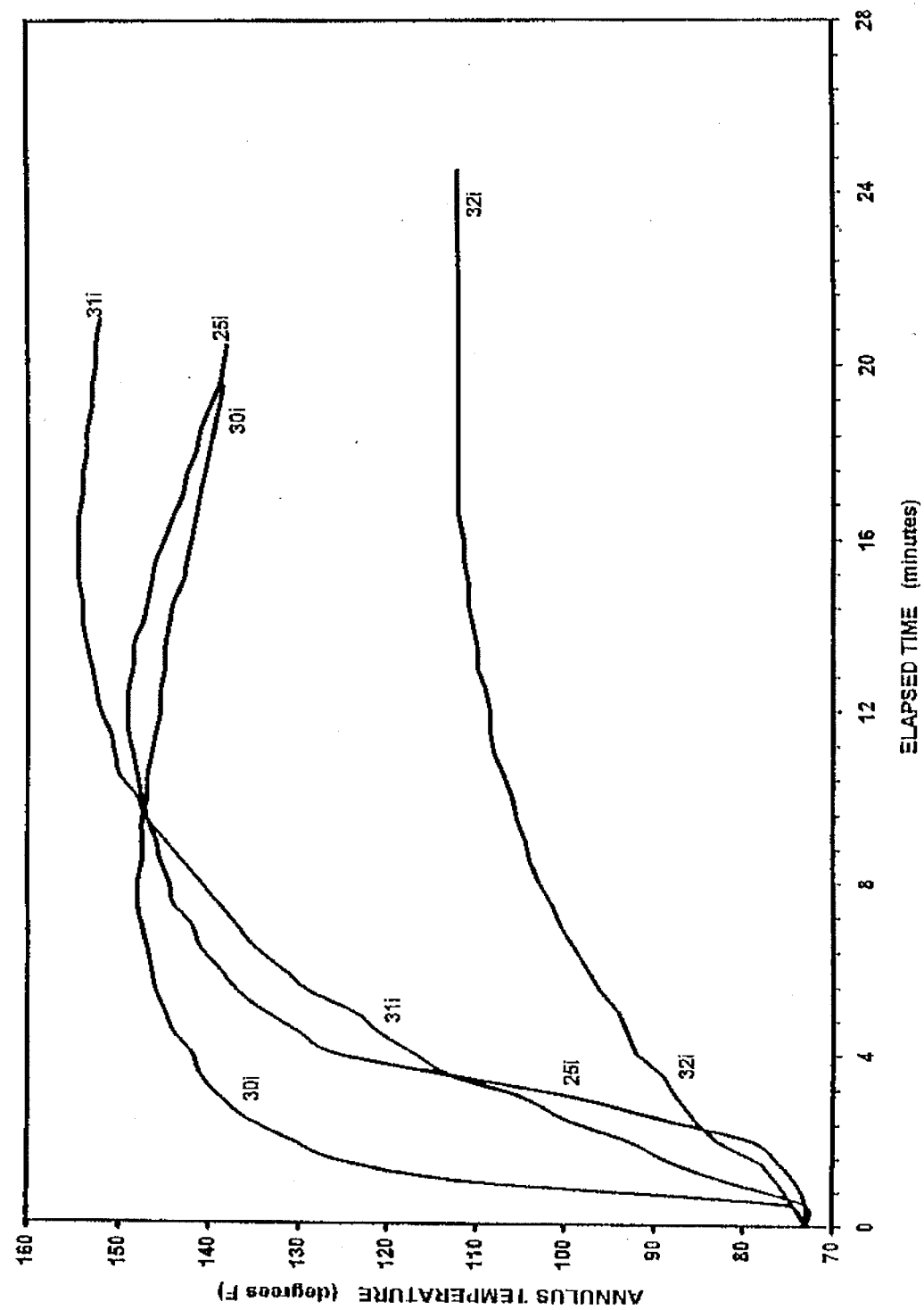

It is clear from the curves in FIGS. 6 and 7 that the reactivity of mixtures of lime and an acid decreases in the order sulfamic, oxalic, tartaric, and citric, the approximate order of the strength of these acids. Mixtures of these or other acids or acidic salts with mixtures of different alkaline earth oxides or with mixtures of quicklimes of different reactivity provide even better control of the shape of the time-temperature curves (larger annulus time-temperature integrals) of the self heating food can than could be obtained by using a single acid or acid salt in the fuel mixture.

In all the fuel mixtures, the end product will be neutral salts of the alkaline earth salts and the acids or acid salts. These salts have no hazardous or toxic properties. Of course, the exact acid-mixture/base-mixture composition that would give maximum control with adequate heating and minimal fuel weight would depend on the heat-transfer and heat-capacity of the food in the can, on the exact design of the self-heating food can and in the case of the use of quick-limes, on the specific reactivities of the industrial grade quicklime materials available for inclusion in the product.

It has been discovered in accordance with the invention that the temperature at which calcium carbonate is calcined, though important, is not the only parameter controlling the reactivity of overburnt lime. The reactivity of the overburnt lime is also influenced by the type of kiln used to calcine the limestone and also the retention time of the limestone in the kiln. The physical nature of the limestone also influences the properties of the calcined product. Calcite limestones have a rhombohedral crystal structure and are soft, having a Moh hardness of about 3 and a specific gravity of about 2.72 $g/cm^3$. Aragonite limestones are more dense (specific gravity of about 2.94 $g/cm^3$), are harder (3.5 to 4.0 Mohs), and have an ortho-rhombic structure.

Rotary kilns and parallel flow regenerative kilns usually produce soft burned, highly reactive limes. Rotary kilns with a small feed size generally produce a somewhat harder burned lime while counterflow, shaft kilns produce the hardest burned limes.

The hardest burned limes have the highest compressive strength and the best resistance to abrasion during handling and storage. Therefore, there will be less physical change in the quicklime fuel when hard burned limes are packaged in the annular chamber.

Samples of quicklimes overburned at temperatures above 1,200° C. had the following properties:

TABLE 1

| SAMPLE | SOURCE | CALCINATION TEMPERATURE | | PROPERTIES |
| | | °F. | °C. | |
| --- | --- | --- | --- | --- |
| 1 | Exshaw, Alberta | 2329 | 1276 | Soft, Chalky |
| 2 | Pavillion, B. C. | 2350 | 1288 | Hard, Dense |
| 3 | Exshaw, Alberta | 2542 | 1394 | Soft, Chalky |
| 4 | Faulkner, Manitoba | 2600 | 1427 | Hard, Dense |
| 5 | Exshaw, Alberta | 2621 | 1438 | Soft, Chalky |

All the samples as received were acorn-to-walnut size particles. The Exshaw materials are soft, chalky, more porous and had a lower density. They crumbled when hit with a hammer. The harder, denser Pavillion and Faulkner materials shattered when hit with a hammer. All materials were crushed to "Grape-nuts" sized particles about 1–4 mm in diameter.

The anhydrous, granular solid acid can be added to the quicklime in an amount up to an equivalent proportion with respect to the quicklime, usually from 10% to 50% by weight of the mixture.

EXAMPLE 2

Figure 8:
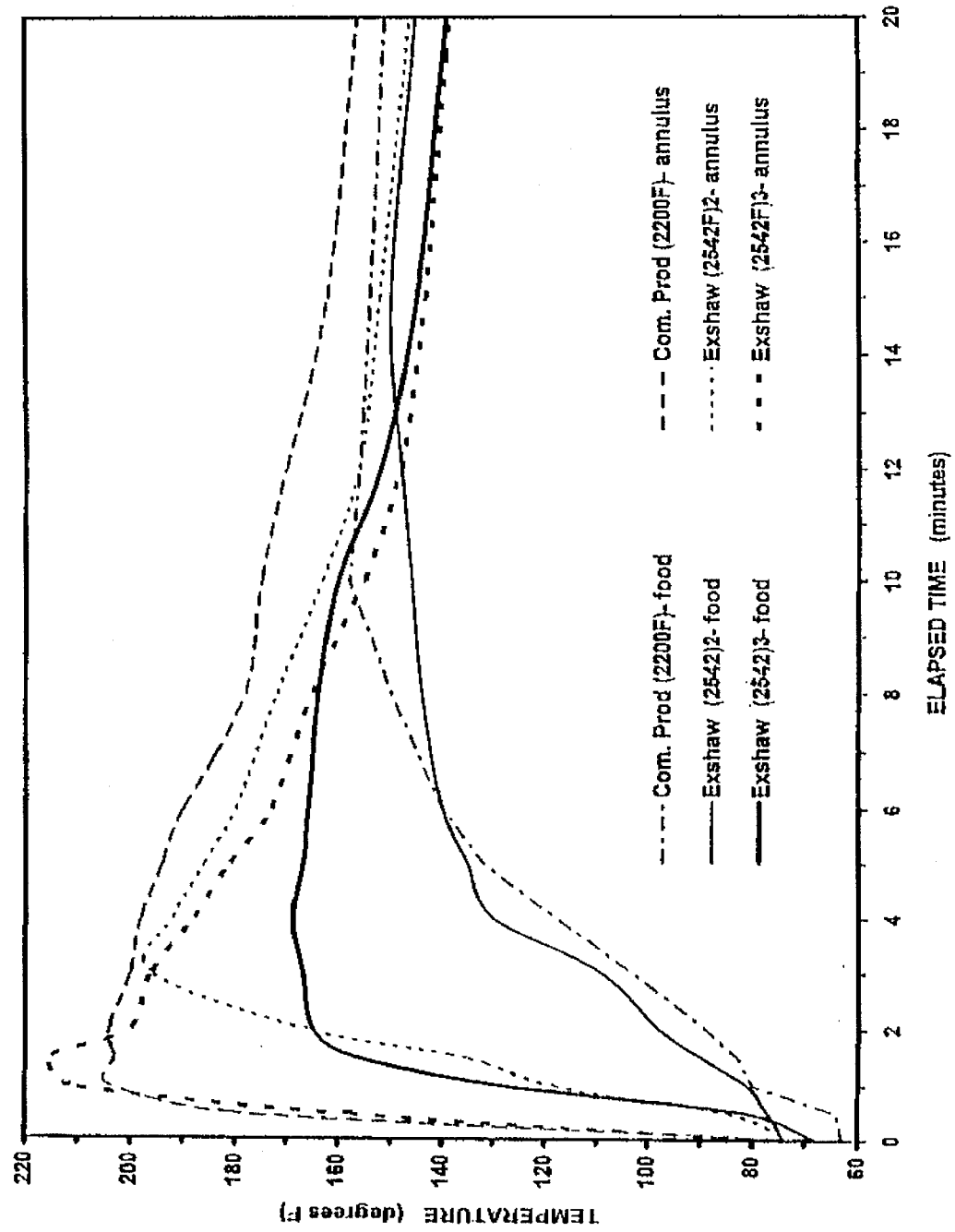
FIG. 8 is a set of inner-can (food) and annulus temperature-time curves for the annulus fuel-water mixtures of Example 4.

A fuel mixture was prepared from 43 grams of the quicklime of Sample 3 from Table 1, an equivalent portion (75 grams) of oxalic acid and 137 grams of water. The water-to-lime ratio was 3.18 and the water-to-fuel ratio was 0.86. The total weight of reactants was 255 grams. The post-test annular chamber contained solid calcium oxalate and some excess water. The pH of the slurry was near neutral. Calcium oxalate is not toxic nor hazardous. The excess water can readily be eliminated by reducing the amount of water in the annular bag. As shown in FIG. 8, the heating performance again closely followed that of the lime-water mixture of the commercial product (155 g of slowly reactive lime, 100 g water, 255 g of total reactant).

EXAMPLE 3

The experiment of Example 2 was repeated by reducing the water in the annular bag to 120 grams. The equivalent mixture of lime and oxalic acid were increased to maintain the total reactants at 255 grams. The results are also shown in FIG. 8. The water simulating food in the inner container was heated in a shorter time to a higher temperature (about 160° F.). The temperature was sustained above 140° C. for at least 20 minutes. There was no excess water in the annulus after the test.

EXAMPLE 4

The experiment of Example 3 was repeated substituting 43 grams of the Exshaw-2621 quicklime of Sample 5 for the Exshaw-2542 quicklime of Sample 3. The heating rate was only very slightly below that of Example 3 and is considered to be satisfactory for a commercial product.

It is to be realized that only preferred embodiments of the invention have been described and that numerous substitutions, modifications and alterations are permissible without departing from the spirit and scope of the invention as defined in the following claims.

I claim:

1. A self-heating, food container comprising in combination:

a first closed container for receiving the food to be heated;

a second container surrounding the first container forming an annular chamber divided by a water impermeable film into an upper compartment and a lower compartment; and a body of fuel consisting essentially of a mixture of particles of a solid anhydrous base that exothermically reacts with water and particles of a solid anhydrous acid that exothermically reacts with said base to produce a non-toxic, non-hazardous salt, received in the lower compartment; and a body of water received in the upper compartment, whereby on rupture of said film, the base exothermically reacts with the water and the acid to produce said salt.

2. A container according to claim 1 in which the particles are from 0.1 to 10 mm in diameter.

3. A container according to claim 2 in which the particles are from 0.5 to 5 mm in diameter.

4. A container according to claim 1 in which the lower compartment contains a solid anhydrous, weak acid that exothermically reacts with said base.

5. A container according to claim 4 in which the acid is a weak organic acid.

6. A container according to claim 4 in which the weak acid is selected from the group consisting of oxalic acid, sulfamic acid, citric acid and tartaric acid.

7. A container according to claim 4 in which the base is an alkaline earth metal oxide.

8. A container according to claim 7 in which the base is quicklime.

9. A container according to claim 8 in which the acid is oxalic acid.

10. A container according to claim 1 in which said salt is neutral.

* * * * *